Nov. 16, 1926.
R. J. WENSLEY
1,606,856
VOLTAGE REGULATOR SYSTEM
Filed August 28, 1922
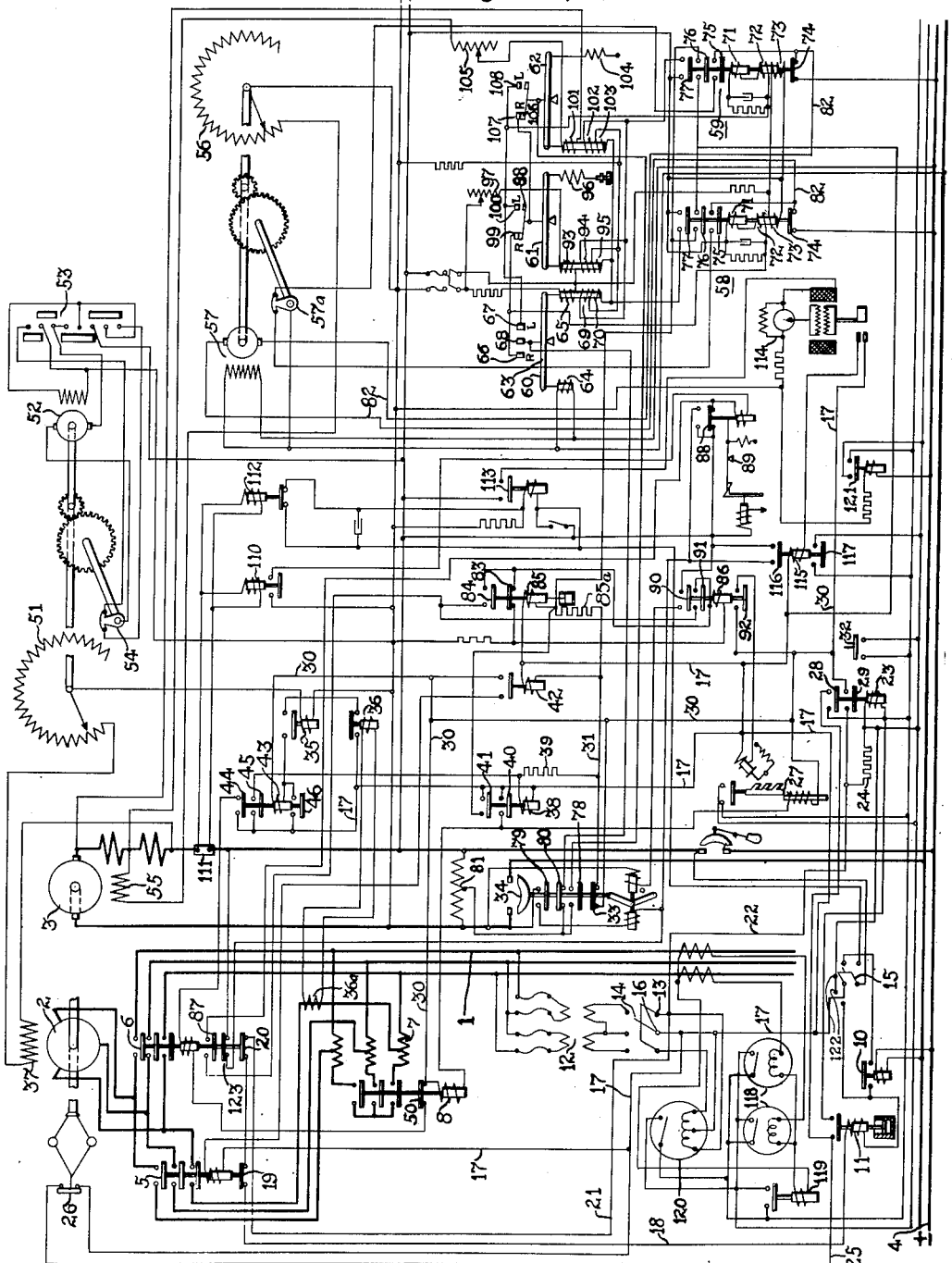
WITNESSES:
R. J. Butler.
J. E. Frater
INVENTOR
Roy J. Wensley.
BY
Wesley G. Carr
ATTORNEY Patented Nov. 16, 1926.

1,606,856

UNITED STATES PATENT OFFICE.

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA.

VOLTAGE-REGULATOR SYSTEM

Application filed August 28, 1922. Serial No. 584,613.

My invention relates to regulator systems and particularly to voltage-regulator systems employed in connection with automatic substations.

One object of my invention is to provide a regulator system for a motor-driven generator that shall regulate the generative voltage to correspond to the direct-current voltage to which it is to be connected, after which it shall regulate the generative voltage to maintain a substantially constant operating value.

Another object of my invention is to provide a system, of the above-indicated character, in which the operating voltage of the generator is maintained substantially constant only while the current supplied to the circuit thereby does not exceed a certain value.

As the load on the generator tends to increase to cause a greater current to flow, the voltage of the generator is regulated to maintain the maximum value of current that is supplied by the generator at such predetermined value.

Another object of my invention is to provide a relay system of control whereby the motor-generator unit may be automatically started in response to a condition of the direct-current circuit and connected between an alternating-current supply circuit and the direct-current load circuit.

Another object of my invention is to provide a system, of the above-indicated character, in which all of the relay devices shall operate in a predetermined sequence dependent upon the proper electrical conditions and operations of the apparatus to be controlled and of the various control devices associated therewith.

Another object of my invention is to provide a system of the above-indicated character that shall be simple in construction and automatic in operation.

In practicing my invention, I provide means for automatically applying starting and running voltages to an alternating-current motor of a motor-generator set. I also provide means whereby, after the motor attains synchronous speed, the voltage of the generator is regulated to correspond to the voltage of the direct-current circuit to which it is to be connected. After the generator is connected to the circuit, its voltage is further maintained substantially constant at a predetermined value so long as the load upon the generator is less than a predetermined value. As the load upon the generator increases, the voltage of the generator is then diminished to preclude the generator from supplying current to the direct-current circuit in excess of a predetermined value.

The single figure of the accompanying drawing is a diagrammatic view of an electrical system embodying my invention.

In the system that is illustrated, energy is derived from an alternating-current circuit 1 and is supplied to a motor-generator unit comprising an alternating-current motor 2 and a direct-current generator 3 whereby such energy is translated to direct-current energy which is then supplied to a direct-current load circuit 4.

The alternating-current energy is supplied to the motor 2 by a starting switch 5 and a running switch 6. The starting switch 5 applies a reduced starting voltage to the windings of the motor 2 which is derived from compensators 7 that are arranged to be connected in operative relation to the alternating-current circuit by a switch 8.

When a demand for energy is manifested on the direct-current circuit 4, as by a decrease in the voltage thereof, a voltage relay or contact-making volt meter 10 is sufficiently de-energized to permit its switch to close to control the energization of a time-element relay 11 which is adjusted to close its contact members approximately five seconds after being energized. Control energy for operating the various relay devices employed in the system is derived from the alternating-current circuit 1 through a plurality of potential transformers 12.

A three-pole, single-throw, manually-operable switch 14 is provided to disconnect the control source from the relay devices in order to permit inspection and testing of the relay devices. A second manually-operable, double-throw switch 15 is provided to permit the manual initiation of the system. When the station is to be initiated manually, the switch 15 is closed on its left-hand side, and, when the station is to be initiated automatically, the switch 15 is closed on the right-hand side.

When the voltage relay 10 closes its switch by reason of a decrease of voltage on the direct-current circuit 4 to a predetermined value, its switch, in closing, completes a circuit to energize the time-element relay 11 from terminal 16 of the switch 14, control bus conductor 17, switch 15, relay switch 10, the operating coil of relay 11, conductor 18, interlock switch 19 of starting switch 5, interlock switch 20 of running switch 6, and conductor 21 to terminal 13 of the switch 14. The time-element relay 11 is thereupon energized to close its switch to energize a master relay 23.

The energizing circuit for the operating coil of the master relay 23 may be traced from terminal 13 through control conductor 22, a resistor 24, the operating coil of relay 23, the switch 11, conductor 25, and an overspeed switch 26 controlled by the motor, to control conductor 17.

The master relay 23, when energized, closes two switches 28 and 29. The switch 29, when closed, connects the control bus conductor 22 to an auxiliary control conductor 30. Switch 28, when closed, provides a holding circuit to maintain the operating coil of the master relay 23 energized, irrespective of fluctuations of voltage in the direct-current circuit 4 which might permit the opening of the switch of the time-element relay 11.

As soon as the auxiliary control bus 30 is energized, a second auxiliary control bus is energized therefrom through an interlock switch 33 of the main direct-current switch 34 which serves to connect the generator to the direct-current circuit 4.

It is desirable, as soon as the master relay 23 operates, to start the motor 2 and to accelerate it to synchronous speed. In order to determine when to transfer the application of electromotive force from starting to running potential, two relay devices 35 and 36 are employed. The relay 35 is connected in circuit with the shunt field winding 37 of the motor, and the relay 36 is energized through a current transformer 36a in accordance with the starting current that is supplied to start the motor. When the starting current decreases to a predetermined value, the relay 36 closes its switch.

When synchronous speed is attained, there is no relative movement between the movable member of the motor and the moving magnetic fluxes, and, therefore, no alternating electromotive force is induced in the shunt field winding. Since the field winding 37 of the motor is connected across the armature of the generator 3, the generator is unable to develop its electromotive force while alternating electromotive forces are induced in the motor field winding. The generator, therefore, immediately develops its electromotive force and energizes the field winding of the motor when synchronous speed is attained.

When the generator voltage attains a value that is sufficient to cause a predetermined current to traverse the circuit of the motor field winding, the field current relay 35 closes its switch. The switches of the two relays 35 and 36 co-operate to control the transition from starting to running condition. This operation may now be traced.

Immediately upon the energization of control bus conductor 31, a relay 38 is energized. The relay 38 is connected in series with a resistor 39 between the control bus conductors 17 and 31. Relay 38, when energized, closes two switches 40 and 41. Switch 40 controls the energization of a notching relay 27 which serves to disconnect the motor from the alternating-current circuit if the motor-generator unit is not connected to the system after three attempts, and also controls the energization of the operating coil of the compensator connecting relay 8 between the control bus conductors 17 and 30. The compensator switch closes to connect the compensator elements to the alternating-current circuit 1 to permit the energization thereof. Switch 41 functions in a manner to be hereinafter described.

Simultaneously with the energization of relay 38, a relay 42 is energized, between bus conductors 17 and 31, to close its switch. Switch 42 connects the operating coil of starting switch 5 between the control bus conductors 17 and 30. The starting switch 5 is, therefore, closed simultaneously with the energization of the compensators 7. Starting potential is applied to the motor 2, and the motor is gradually accelerated.

During the accelerating period, the current value is large and is sufficient to maintain the relay 36 open. When synchronous speed is attained, the starting current suddenly decreases to or below a predetermined value at which value the relay 36 closes. At the same time, the generator gradually develops its electromotive force which energizes the field winding 37 of the motor to a degree that is sufficient to cause the relay 35 to close.

The two relays 35 and 36, when closed, complete the circuit of the operating coil of a transfer relay 43 by connecting the coil between the control bus conductors 17 and 30. The transfer relay 43, when energized, closes three switches 44, 45 and 46, respectively. Switch 46, when closed, completes a holding circuit for the operating coil of the transfer relay to maintain the same energized after the relay 36 is de-energized by reason of the transfer to running condition.

The switch 45, in closing, short-circuits the operating coil of relay 38, thereupon de-energizing that relay and permitting its switches 40 and 41 to open. Switch 40, in opening, de-energizes the compensator switch 8. The compensator switch 8, in opening, closes an interlock switch 50. The switch 50 co-operates with the switch 44 of the transfer relay 43 to connect the operating coil of the running switch 6 between the control bus conductors 17 and 30. The motor 2 is now subjected to the normal potential of the alternating-current circuit 1, and the relay 36 is de-energized.

The circuit of the motor field winding 37 contains a motor-operated rheostat 51 which is controlled by a small direct-current motor 52 through a manually-operable switch 53. A limit switch 54 is provided to prevent overtravel of the contact arm of the rheostat 51. Energy for operating the motor 52 is derived from the generator 3. The rheostat 51 may be adjusted at will according to the load conditions that prevail and then may be left at a setting that will permit a desired degree of energization of the motor.

The generator 3 is provided with a shunt field winding 55, the circuit of which also contains a motor-operated rheostat 56. An operating motor 57 and a limit switch 57a are provided. The operating motor 57 is controlled by two switching devices 58 and 59, which, in turn, are controlled by three regulating devices 60, 61 and 62, respectively.

Since the voltage of the direct-current circuit 4 may be below the normal operating voltage by reason of the load thereon, it is desirable to so regulate the voltage of the generator that it corresponds to the voltage of the circuit before connecting the generator thereto and to regulate the voltage of the generator after the connection is effected to maintain the normal operating voltage of the circuit.

In order to prevent excessive overload of the generator, it is also desired to decrease the voltage thereof if the current demand attains a predetermined value, such as, for example, 125% full-load current. The voltage will be regulated to permit the supply of such value of current to the circuit as a maximum value.

The regulator 60 comprises a normally-balanced pivoted member 63, the operation of which is controlled by two coils 64 and 65 to effect the engagement of contact members 66 and 67 by a contact member 68. The regulator is also provided with two anti-hunting coils 69 and 70, the operation of which will be hereinafter explained.

The operating coil 64 of the regulator 60 is connected to, and energized from, the direct-current circuit 4. The coil 65 is connected across the brushes of the generator 3. The regulator 60 co-operates with the control switches 58 and 59 to control the energization of the rheostat motor 57. The voltage of the generator is thus raised or lowered until it corresponds to the voltage of the direct-current circuit.

The switches 58 and 59 severally comprise a main operating coil 71, a differential coil 72 and a holding coil 73. The holding coils 73 of the two devices 58 and 59 are arranged to be continuously energized so that, when the coils 71 and 72 are de-energized, a back-contact interlock switch 74 will be maintained in effective engagement. When the coils 71 and 72 are energized, the coil 72 neutralizes the effect of coil 73 and the operating coil 71 is, therefore, effective in closing three switches 75, 76 and 77.

Let it be assumed that the voltage of the generator is less than that of the circuit 4. The coil 64 is, therefore, energized to a greater degree and effects engagement between the contact members 66 and 68. The main switch 34 that connects the generator to the direct-current circuit is still open. Two additional interlock switches 78 and 79 are opened in this position of the main switch 34 and another interlock switch 80 is closed in such position.

In the open position of the switch 34, the contact member 68 of the regulator 60 is connected, through interlock switch 80, to the midpoint of a resistor 81 that is energized from the generator 3. Upon engagement of contact members 66 and 68, a circuit is thereupon completed from the positive terminal of the generator through the resistor 81, the switch 80, contact members 68 and 66 and the coils 72 and 71 of the switching device 58 to the negative terminal of the generator. The switches 75, 76 and 77 are thereupon closed. Switching device 58 controls the increasing of the generator voltage.

It will be noted that the field winding of the rheostat motor 57 is continuously energized in the same direction from the direct-current circuit 4. In order to procure reverse movement of the rheostat arm, current is reversed through the armature of the motor.

As the switch 75 closes, the switch 74 opens. The circuit through the armature of the rheostat motor may, therefore, be traced from the positive conductor of the direct-current circuit through interlock switch 74 of the switching device 59, circuit 82, including the armature of the motor 57, interlock switch 75 of switching device 58, and limit switch 57a to negative conductor of the direct-current circuit. The motor 57 is thereupon actuated in such direction as to decrease the amount of resistance in circuit with the shunt field winding of the generator. As the voltage of the generator gradually increases, by reason of the increased excitation of the field winding, the coil 65 of the regulator 60 becomes energized to a greater degree, tending to balance the coil 64.

Switch 77, of switching device 58, when closed, connects coil 70 of the regulator 60 between the positive and the negative terminals of the generator. The effect of the coil 70 is to assist the action of the generator coil 65 in balancing against the circuit coil 64 and tending thereby to disengage contact member 68 from the contact member 66 slightly before the time when the actual electromotive force developed by the generator is equal to the voltage of the direct-current circuit. This feature tends to prevent hunting of the regulator which would otherwise be caused by reason of the lag in the development of the generator electromotive force that is caused by the inductive effect of the windings which tends to delay the excitation of the field-magnet pole members.

If the voltage of the generator should exceed the voltage of the direct-current circuit, the contact member 68 would engage the contact member 67 to effect the operation of the switching device 59 to lower the generator voltage. The armature of the rheostat motor 57 will now be energized in the opposite direction from that previously described and will operate the rheostat to increase the amount of resistance in circuit with the field winding. The excitation of the coil 65 will, under such circumstances, be gradually diminished.

The coil 69 is now effective to operate in a direction opposite to that of the coil 70 to assist in the de-energization of the coil 65 to thereby prevent overtravel of the rheostat and the consequent hunting effect. The coil 69 is connected to the terminals of the generator by the switch 77 of the switching device 59.

A rheostat and a condenser are connected across the terminals of the operating coils of the switching devices 58 and 59 and absorb the electromagnetic energy that is stored in such windings upon disconnection of the contact members of the regulator 60. The voltage of the generator may thus be regulated until it corresponds to the voltage of the direct-current circuit. Under such conditions, the contact member 68 will be disengaged from both contact members 66 and 67 and the switching devices 58 and 59 will be in their respective de-energized positions.

When the generator voltage is equal to the voltage of the direct-current circuit, a relay 85 operates, after a few seconds of such condition of equality, to open a switch 83 and to close a switch 84. Switch 84 completes the circuit of the operating coil of a relay 86 which controls the closing of the main switch 34. The circuit of the operating coil of relay 86 may be traced from positive terminal of the generator through the coil of the relay 86, the switch 84 of relay 85, interlock switch 87, that is closed when the running switch 6 is closed, and a switch 88 of a lockout relay 89 to the negative terminal of the generator.

The relay 86, when energized, closes three switches 90, 91 and 92. Switch 90, when closed, connects the closing coil of the main direct-current circuit switch 34 between the positive and negative terminals of the generator, thereby closing the switch 34 to connect the generator to the direct-current circuit 4. Switch 91 completes a holding circuit for the operating coil of relay 86 to maintain the same energized. Switch 92, when closed, energizes the resetting coil of the notching relay 27.

The timing relay 85, which controls the energization of the relay 86 to close the main switch 34, is operative only after normal potential is applied to the motor, and the generator voltage corresponds to the circuit voltage.

While the motor is being accelerated by the starting voltage, switch 41 of relay 38 short-circuits the operating coil of relay 85. The short-circuit is removed by the switch 41 when the transfer relay 43 operates and renders relay 38 ineffective. Before the relay 85 may operate, however, the voltage regulator 60 energizes one of the switching devices 58 and 59 for regulating the generator voltage. The switches 76, of both switching devices 58 and 59, are adapted, when closed, to short-circuit the operating coil of the relay 85. When all of the switches that are adapted to short-circuit the coil of relay 85 are open, this coil is energized through a circuit extending from control conductor 17, through said coil, a resistor 85a, and interlock switch 33 of main switch 34, to control conductor 30. The relay 85 will, therefore, operate only after the motor is in running condition and the generator voltage regulated to correspond to the circuit voltage.

Although I have specified herein that the generator voltage must correspond to the circuit voltage, it is considered desirable actually to regulate the generator voltage to a value slightly in excess of the circuit voltage to permit the generator to immediately assume a portion of the load on the circuit.

If the voltage at which the generator is connected to the direct-current circuit is less than the normal operating voltage of the circuit, as where the voltage of the generator, when connected to the circuit, is 220 volts, whereas the normal operating voltage is 250 volts, it is desirable to raise the generator voltage to the normal operating value. The voltage regulator device 61 controls the excitation of the field winding of the generator, to maintain the voltage thereof at a predetermined operating value, dependent upon the load being less than a predetermined amount. The regulator 61 is provided with an operating coil 93 and two anti-hunting coils 94 and 95.

An adjustable spring 96 is provided to control the balance point of the regulator, and a variable resistor 97 is connected in circuit with the operating coil 93 across the terminals of the generator to provide further sensitivity of adjustment of the regulator by controlling the excitation of the operating coil 93. A contact member 98 is provided and normally engages a contact member 99 when the regulator is de-energized, and engages a contact member 100 when the relay is energized to a degree exceeding the adjustment of the spring 96.

The regulating device 62 is similar in construction and in operation to the regulating device 61 and comprises an operating coil 101, two anti-hunting coils 102 and 103, a spring 104, a regulating resistor 105 and a movable contact member 106 which normally engages a contact member 107, when the regulator is de-energized, and a contact member 108 when the regulator is energized to a degree exceeding the adjustment and setting of the spring 104.

While the regulator 61 responds to the voltage of the generator and controls the switching devices 58 and 59 in accordance with such voltage, the regulator device 62 is energized in accordance with the current that is supplied by the generator to the circuit and controls the switching devices 58 and 59 in accordance with the value of such current. The voltage regulator 61 thus tends to maintain the voltage of the generator substantially constant while the load is less than 125% full-load value, but, after the load attains such value, the load regulator 62 assumes control and then regulates the voltage in accordance with the demand for energy.

The generator was connected to the circuit as soon as the voltage of the generator and of the circuit corresponded. Upon the closing of the main direct-current switch 34, the interlock switch 78 was closed. Switch 78 thereupon connected the movable contact member 106 of the load regulator 62 to the midpoint of the resistor 81 that is energized from the generator.

With the closing of the main direct-current switch 34, the interlock switch 33 was opened, thereby de-energizing the auxiliary control conductor 31. The resistor 39 and the relays 42 and 85 are thereupon de-energized. The consequent opening of switch 42 opens the starting switch 5. Similarly, the return of switch 85 to its normal de-energized position short-circuits the operating coil of relay 86 which is subsequently disconnected from the energizing circuit by the opening of its interlock switch 91. The closing coil of the direct-current switch 34 is thereupon de-energized. The switch is latched, however, in its closed position.

So long as the current that is supplied by the generator to the circuit is less than the predetermined value, moving contact member 98 of the voltage regulator 61 will also be connected to the resistor 81 and will be operative to control the voltage of the generator to maintain the same constant.

Let it be assumed that the generator voltage was less than the normal operating voltage when connected to the circuit. Contact member 98 is, therefore, engaged with contact member 99. The switching device 58 will be energized to close its switches and to effect the energization of the rheostat motor in such direction as to decrease the amount of resistance in the field circuit. The voltage of the generator will, therefore, be increased until the voltage attains a predetermined value corresponding to the setting of the voltage regulator 61.

If the voltage should, for any reason, increase above such operating value, the contact member 98 would engage the contact member 100 and energize the switching device 59, whereupon the rheostat would be controlled to decrease the voltage of the generator. The regulator 61 is thus effective to maintain the voltage of the regulator substantially constant so long as the current traversing the generator is less than the predetermined value.

As soon as the generator current attains or exceeds such predetermined value, the load regulator 62 is energized to effect the disengagement of the contact members 106 and 107. Operating potential is thereupon removed from the movable contact member 98 of the voltage regulator 61 and it is rendered ineffective. The load regulator 62, being energized by excessive current, effects engagement of the contact members 106 and 108. The switching device 59 is thereupon energized to effect a decrease in the voltage of the generator. The load regulator 62 will continue to effect a decrease in the voltage of the generator until a suitable voltage is attained at which the current supplied to the generator does not exceed a predetermined amount.

As the load tends to decrease again, the regulator 62 is energized to a lesser degree, whereupon the contact member 106 engages the contact member 107, thereby providing operating potential to the contact member 98 of the regulator 61. The regulator 61 becomes immediately effective to raise the voltage of the generator to its normal operating value.

The three regulators 60, 61 and 62 thus operate to control the voltage of the generator by means of the switching devices 58 and 59. The switching device 58 is operated to raise the voltage, and the switching device 59 is operative to lower the voltage of the generator. If, for any reason, the load-regulating device should not function and the generator should be overloaded to an excessive degree, a load relay 110, that is energized from a shunt 111 in circuit with the generator, will complete the circuit of the operating coil of the lockout relay 89, thereby opening the switch 88 in its lower position and closing it in its upper position.

The details of construction and arrangement of the regulator elements illustrated herein constitute the subject matter of a co-pending application of Clarence A. Boddie filed together herewith, Serial No. 584,600, relating to voltage regulator systems and assigned to the Westinghouse Electric & Manufacturing Company.

The switch 88, when opened in its lower position and closed in its upper position, is operative to preclude the energization of the relay 86 which controls the closing of the main direct-current switch 34 and serves also to complete the circuit of the trip coil of the main switch 34, which circuit is opened by the interlock switch 79 upon the opening of the main switch 34.

The trip coil of the main direct-current switch 34 is similarly energized when the load on the generator decreases to a predetermined amount for a predetermined interval of time, as, for example, when the load decreases to 15% of the full load for ten or fifteen minutes. Under such conditions, an underload relay 112 is permitted to close its switch to connect the operating coil of an auxiliary relay 113 across the terminals of the generator.

The relay 113 closes its switch to energize a timing relay 114 which is adjusted for any predetermined interval of time, such as ten or fifteen minutes. After operating for the adjusted interval of time, the timing relay 114 closes its switch to connect the operating coil of a relay 115 between the control conductors 17 and 30.

The relay 115 closes two switches 116 and 117. The switch 116 connects one terminal of the trip coil to the negative terminal of the generator and, since the other end of the trip coil is already connected to the positive terminal, the trip coil is energized to open the main switch 34. Simultaneously, the switch 117 short-circuits the operating coil of the master relay 23 which opens and de-energizes the control conductor 30. The operating coils of the various relay devices that are energized from the control conductor 30 are, therefore, de-energized, and the running switch 6, being connected across such conductors, is also de-energized to disconnect the motor from the alternating-current circuit.

A plurality of overload relays 118 are provided to protect the motor from being overloaded. A thermal relay 119, which is arranged to have a thermal characteristic corresponding substantially to that of the machine, is also provided to protect the motor from overheating, and a relay 120 is provided to preclude the connection of the motor to the alternating-current if abnormal phase or voltage conditions obtain, such as open-phase, reverse-phase or low-voltage conditions.

These relays are all of the contact-closing type, and the contact switches that are controlled thereby are all connected in parallel with the switch 117 to short-circuit the operating coil of the master relay 23. Other switches that are controller in response to predetermined abnormal conditions, or are manually operable, such as a push-button switch 32, may be arranged to short-circuit the operating coil of the master relay 23 in a similar manner. The devices are thus operative either to preclude the energization of the master relay 23 before the motor is connected to the circuit or to de-energize the relay to disconnect the motor after it has already been connected to the circuit.

An over-voltage relay 121 is provided to prevent the connection of the generator to the direct-current circuit if, by chance, the polarity of the generator should become reversed. The winding of relay 121 is connected between the positive terminal of the generator and the positive conductor of the direct-current circuit 4. The switch that is controlled by the relay 121 is arranged to be closed only when the winding of the relay is energized to a predetermined degree exceeding the voltage of the generator, corresponding substantially to the sum of the voltages of both the generator and of the circuit.

When it is desired to stop the operation of the motor generator after it has been operating, irrespective of whether it was automatically initiated or manually initiated, the switch 15 is opened to its full-open position. The upper switch blade, when actuated to such position from either side, engages one of two fingers 122, whereupon the operating coil of the master relay 23 is short-circuited and the motor is disconnected from the alternating-current circuit.

When the running switch 6 of the motor opens, an interlock switch 123 is closed which completes the energizing circuit of the trip coil of the direct-current switch 34, thereby opening the switch to disconnect the generator from the direct-current circuit.

The system embodying my invention thus contemplates the automatic or manual initiation of a motor-generator unit, accelerating the same to synchronous speed and regulating the voltage of the generator until it corresponds to the voltage of the direct-current circuit before permitting the connection of the generator thereto. After the generator is connected to the circuit, this voltage is then regulated and maintained at a predetermined value as long as the load thereon is less than a predetermined amount. When the load attains such predetermined amount, the voltage of the generator is then regulated to preclude the current supplied to the circuit from exceeding such predetermined value.

My invention is not limited to the specific elements that are illustrated or to the arrangement thereof, as illustrated, since various modifications may be made therein without departing from the spirit and scope of my invention, as set forth in the appended claims.

I claim as my invention:

1. In an electrical system, the combination with an alternating-current circuit, a direct-current circuit and a transformer for translating energy therebetween, of means for connecting the transformer between the two circuits comprising means for regulating the voltage generated at the direct-current end of the transformer to correspond to the voltage of the direct-current circuit, connecting the transformer to the direct-current circuit and then regulating the voltage generated by the transformer to maintain said voltage substantially constant at a predetermined value as long as the current traversing the transformer is less than a predetermined value, and to reduce said voltage whenever necessary to prevent said current from exceeding said value.

2. In an electrical system, the combination with an alternating-current circuit, a direct-current circuit and a transformer for translating energy therebetween, of means for connecting the transformer between the two circuits, means for regulating the transformer voltage until it corresponds to the voltage of the direct-current circuit, means for then controlling the connection of the transformer to the direct-current and means for then regulating the transformer voltage to maintain said voltage at a predetermined value as long as the current traversing the transformer is less than a predetermined value, and to reduce said voltage whenever necessary to prevent said current from exceeding said value.

3. In an electrical system, the combination with an alternating-current circuit, a direct-current circuit and a motor generator unit for translating energy therebetween, of means for connecting the motor to the alternating-current circuit, means for connecting the generator to the direct-current circuit, means for regulating the excitation of the generator field winding to cause the generator voltage to correspond to the voltage of the direct-current circuit to permit the generator connecting means to function and for subsequently regulating the excitation of the winding to maintain the generated voltage at a predetermined value as long as the current supplied by the generator is less than a predetermined value, and to reduce the generated voltage whenever necessary to prevent said current from exceeding said value.

4. The combination with a direct-current circuit, a direct-current generator and connecting means therebetween, of means for controlling the excitation of the shunt field winding of the generator to cause the generated voltage to correspond to the voltage of the circuit, actuating the connecting means and then regulating the excitation of the field winding to maintain the generated voltage at a predetermined value as long as the current supplied by the generator is less than a predetermined value, and to reduce the generated voltage whenever necessary to prevent said current from exceeding said value.

5. In an electrical system of distribution, the combination with an electric circuit and a generator for supplying energy thereto, of means for regulating an electrical characteristic of the generator until it corresponds to the same characteristic of the circuit, means for connecting the generator to the circuit and means for then regulating the same characteristic of the generator to maintain the same at a predetermined value as long as another characteristic of the generator is within a predetermined range, and to vary said first-mentioned characteristic whenever necessary to maintain said last-mentioned characteristic within said predetermined range.

6. The combination with a direct-current circuit, a generator for supplying energy thereto and connecting means therebetween, of regulating means therefor comprising means for controlling the excitation of the field winding to regulate the generator voltage to correspond to the circuit voltage to permit the connection of the generator to the circuit, to then maintain the generator voltage at a predetermined value while the load on the generator is less than a predetermined value, and to vary the generator voltage to preclude the generator current from exceeding a predetermined value.

7. The combination with two independent sources of energy and connecting means therebetween, of means for regulating the voltage of one source of energy, means responsive to the voltages of both sources for controlling one source to cause the voltage thereof to correspond to the voltage of the other source and the subsequent connection of the two sources, and means for then regulating the voltage of one source to maintain the same at a predetermined value as long as the current traversing the connecting means is within a predetermined range, and to vary said voltage whenever necessary to maintain said current within said range.

8. The combination with two independent sources of energy and connecting means therebetween, of means for regulating the voltage of one source of energy, means responsive to the voltages of both sources for controlling one source to cause the voltage thereof to correspond to the voltage of the other source and for controlling the subsequent connection of the two sources, and means for then regulating the voltage of one source to limit the exchange of current to a predetermined value and to maintain said voltage substantially constant at a predetermined value when the exchange of current is below its predetermined value.

9. The combination with two independent sources of energy and connecting means therebetween, of means for regulating the voltage of one source of energy, means responsive to the voltages of both sources for controlling one source to cause the voltage thereof to correspond to the voltage of the other source and the subsequent connection of the two sources, and means operative to regulate the voltage of one source to maintain the same at a predetermined value until the current transferred attains or exceeds a predetermined value and operative thereafter to limit the transferred current to such predetermined value.

10. The combination with a direct-current circuit and a generator provided with a shunt field winding for supplying energy to the circuit, of means for controlling the excitation of the field winding, differential means responsive to the difference between the generator and the circuit voltages for controlling said excitation means, and means responsive to the voltage of the generator under certain predetermined conditions, and to the current traversing the generator under certain other predetermined conditions for also controlling said excitation means.

11. The combination with an electric circuit and a dynamo electric machine provided with a shunt field winding, of means for connecting the machine to the circuit when the voltages of both are substantially equal and means for then controlling the excitation of the field winding to maintain a predetermined voltage at the terminals thereof as long as the current supplied thereby is less than a predetermined value, and to reduce said voltage sufficiently whenever necessary to limit said current to said predetermined value.

12. In an electrical system, the combination with a supply circuit, a distribution circuit, a device for translating energy therebetween, and means for automatically starting the translating device in response to predetermined conditions, of means for automatically regulating the voltage generated by the translating device to correspond to that of the distribution circuit, means for then automatically connecting the device to the distribution circuit, means for then maintaining the voltage generated by the translating device at a substantially constant predetermined value as long as the current supplied by the translating device is less than a predetermined value, and means for preventing said current from exceeding said value.

13. In an electrical system, the combination with a supply circuit, a distribution circuit, a device for translating energy therebetween, and means for automatically starting the translating device in response to predetermined conditions in the distribution circuit, of means for automatically regulating the voltage generated by the translating device to correspond to that of the distribution circuit, means for then automatically connecting the device to the distribution circuit, and means for then maintaining the voltage generated by the translating device at a substantially constant predetermined value as long as the load on the translating device is less than a predetermined value, and for reducing the generated voltage whenever necessary to limit the load to its predetermined value.

14. In an electrical system, the combination with a supply circuit, a distribution circuit, a device for translating energy therebetween, and means for automatically starting the translating device in response to predetermined conditions, of means for automatically regulating the voltage generated by the translating device to correspond to that of the distribution circuit, means for then automatically connecting the device to the distribution circuit, means for then maintaining the voltage generated by the translating device at a substantially constant predetermined value as long as the load on the translating device is below a predetermined value, and means for preventing said load from exceeding said value.

15. In an electrical system, the combination with a supply circuit, a distribution circuit, a device for translating energy therebetween, and means for automatically starting the translating device in response to predetermined conditions in the distribution circuit, of means for automatically regulating the voltage generated by the translating device to correspond to that of the distribution circuit, means for then automatically connecting the device to the distribution circuit, means for then maintaining the voltage generated by the translating device at a substantially constant predetermined value, and means for rendering said last-mentioned means ineffective when the load on the translating device attains a predetermined value.

16. In an electrical system, the combination with a supply circuit, a distribution circuit, a device for translating energy therebetween, and means for automatically starting the translating device in response to predetermined conditions, of means for automatically regulating the voltage generated by the translating device to correspond to that of the distribution circuit, means for then automatically connecting the device to the distribution circuit, and means for then regulating the voltage generated by the translating device in such manner as to limit the load on the translating device to a predetermined value and to maintain said voltage substantially constant at a predetermined value when said load is below its predetermined limit.

17. In an electrical system, the combination with a supply circuit, a distribution circuit, a device for translating energy therebetween, and means for automatically starting the translating device in response to predetermined conditions in the distribution circuit, of means for automatically regulating the voltage generated by the translating device to correspond to that of the distribution circuit, means for then automatically connecting the device to the distribution circuit, and means for then regulating the voltage generated by the translating device in such manner as to limit the load on the translating device to a predetermined value and to maintain said voltage substantially constant at a predetermined value when said load is below its predetermined limit.

In testimony whereof, I have hereunto subscribed my name this 25th day of August, 1922.

ROY J. WENSLEY.